United States Patent [19]

Yamada

[11] Patent Number: 5,265,253
[45] Date of Patent: Nov. 23, 1993

[54] METHOD OF UNROLLING/OPTIMIZING REPETITIVE LOOP

[75] Inventor: Syouichirou Yamada, Tokyo, Japan

[73] Assignee: NEC Corporation, Japan

[21] Appl. No.: 747,933

[22] Filed: Aug. 21, 1991

[30] Foreign Application Priority Data

Aug. 22, 1990 [JP] Japan .................. 2-220231

[51] Int. Cl.[5] .............................................. G06F 9/44
[52] U.S. Cl. ............................ 395/700; 364/DIG. 1; 364/262.0; 364/262.1; 364/280.4
[58] Field of Search ................ 395/700; 364/DIG. 1, 364/241.1, 242.94, 262.0, 262.1, 280.4

[56] References Cited

U.S. PATENT DOCUMENTS 5,121,498 6/1992 Gilbert et al. ................... 395/700

Primary Examiner—Thomas M. Heckler
Assistant Examiner—A. Katbab
Attorney, Agent, or Firm—Foley & Lardner

[57] ABSTRACT

A method of unrolling/optimizing a repetitive loop, in which a program compiler in a computer system unrolls and optimizes a repetitive loop instruction, includes the following steps. It is checked whether the number of times that a loop in an input source program is repeated is an even number. If it is determined that the number of times of repetition is an even number, it is checked whether there are a definition and a reference which span the respective repetitions of the loop. If it is determined that there are neither definition nor reference, an instruction string in the loop is unrolled a plurality of times in response to the loop instruction. The index value of the newly unrolled instruction string is updated by predetermined arithmetic processing including a calculation based on an initial value, a terminal value, and an incrementation value of the loop. The terminal value of the loop is updated by predetermined arithmetic processing including a calculation based on the initial, terminal, and incrementation values of the loop.

6 Claims, 3 Drawing Sheets

METHOD OF UNROLLING/OPTIMIZING REPETITIVE LOOP

BACKGROUND OF THE INVENTION

The present invention relates to a program compiler and, more particularly, to a method of unrolling/optimizing a repetitive loop.

In a conventional method of consecutive access to the same memory bank by means of a loop, the execution time is undesirably prolonged because of repetitive processing by the loop. In order to minimize the execution time, the loop is optimized. For example, unroll-/optimization of a DO loop in a FORTRAN compiler is performed by changing the incrementation value of the DO loop.

If, however, a DO loop is optimized by changing its incrementation value as in the conventional method, contention between memory banks may occur, resulting in an increase in execution time.

SUMMARY OF THE INVENTION

It is an object of the present invention to provide a method of unrolling/optimizing a repetitive loop, which can shorten the execution time of a program.

It is another object of the present invention to provide a method of unrolling/optimizing a repetitive loop, which can prevent contention between memory banks.

In order to achieve the above objects, according to the present invention, there is provided a method of unrolling/optimizing a repetitive loop, in which a program compiler in a computer system unrolls and optimizes a repetitive loop instruction, comprising the steps of checking whether the number of times that a loop in an input source program is repeated is an even number, checking whether there are a definition and a reference which span the respective repetitions of the loop, if it is determined that the number of times of repetition is an even number, unrolling an instruction string in the loop a plurality of times in response to the loop instruction, if it is determined that there are neither definition nor reference, updating an index value of the newly unrolled instruction string by predetermined arithmetic processing including a calculation based on the initial, terminal, and incrementation values of the loop, and updating the terminal value of the loop by predetermined arithmetic processing including a calculation based on the initial, terminal, and incrementation values of the loop.

BRIEF DESCRIPTION OF THE DRAWINGS

FIG. 3 is a view showing an instruction string of a source program; and

FIG. 4 is a view showing a new instruction string obtained by unrolling/optimizing the DO loop instruction string shown in FIG. 3.

DESCRIPTION OF THE PREFERRED EMBODIMENT

The present invention will be described below with reference to the accompanying drawings.

Figure 1:
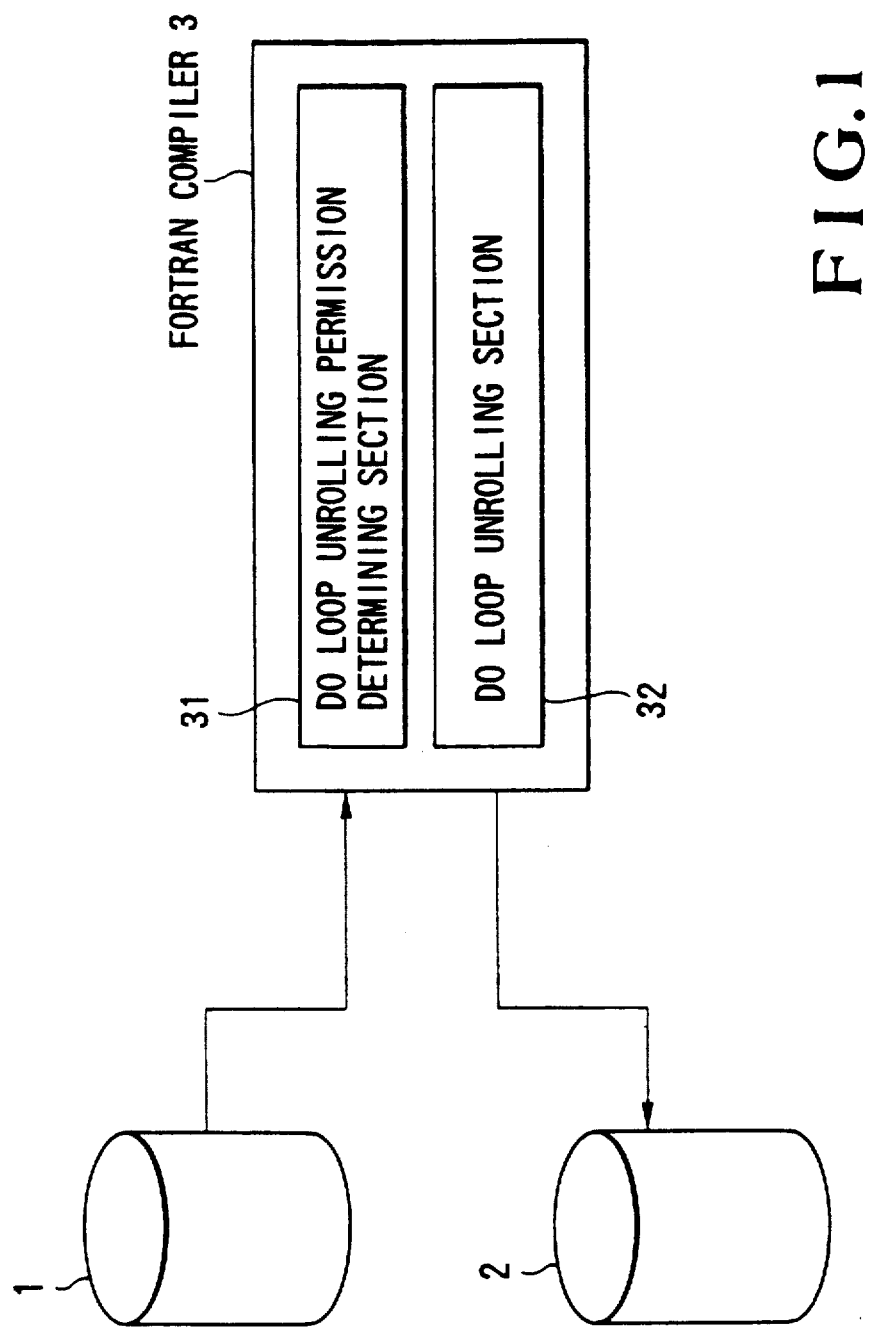
FIG. 1 is a block diagram showing an embodiment of the present invention.

FIG. 1 shows an embodiment of the present invention. In this embodiment, FORTRAN will be exemplified as a program language. A FORTRAN compiler 3 receives a source program from a FORTRAN source program file 1, and causes a DO loop unrolling permission determining section 31 to check whether the program satisfies predetermined conditions. With respect to a DO loop which satisfies the conditions, the FORTRAN compiler 3 causes a DO loop unrolling section 32 to perform an unrolling operation for optimization. In addition, the FORTRAN compiler 3 compiles a program which is optimized or to be optimized, and outputs the resultant program as a target program to a target program file 2.

Figure 2:
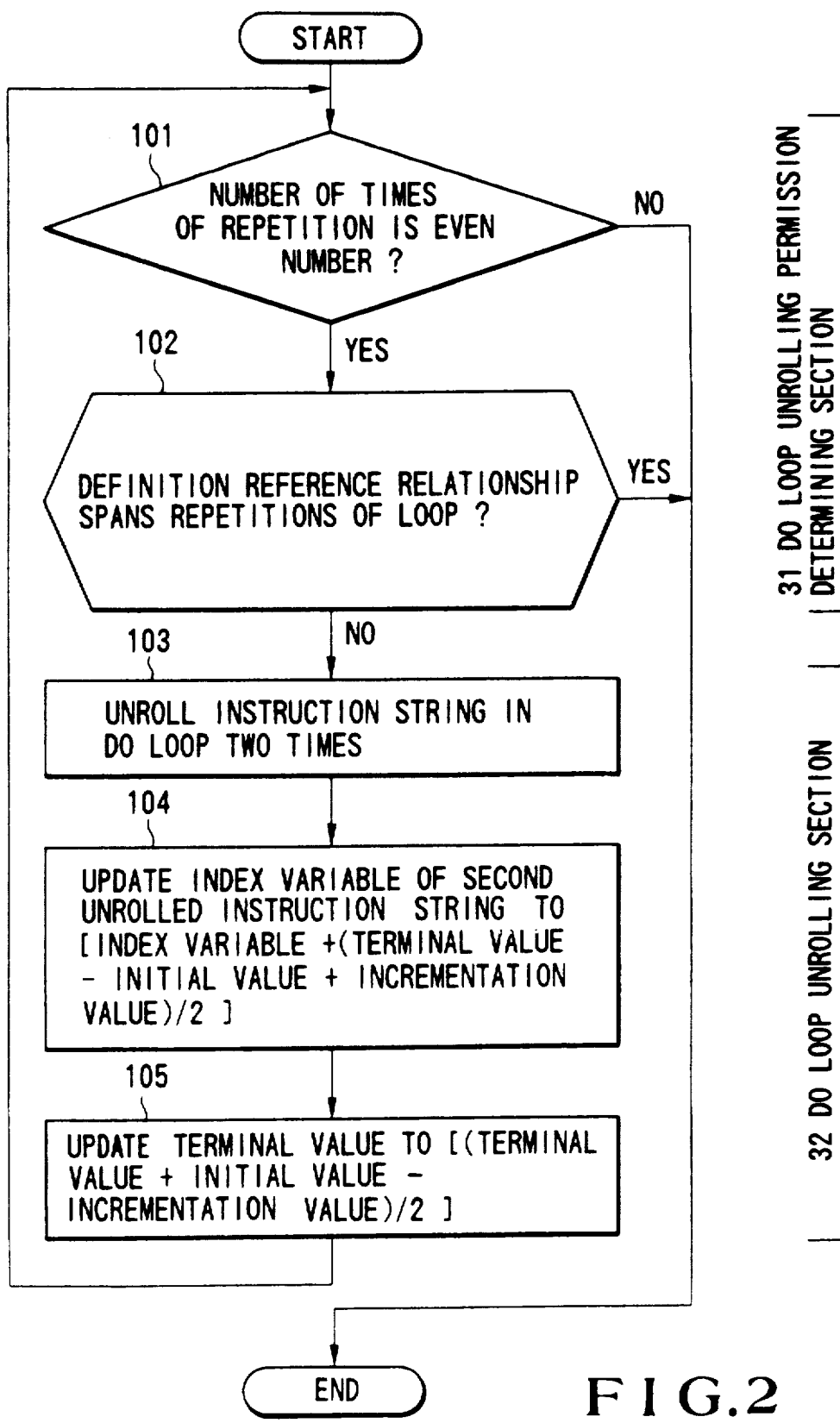
FIG. 2 is a flow chart for explaining an operation of the present invention.
Figures 3, 4:
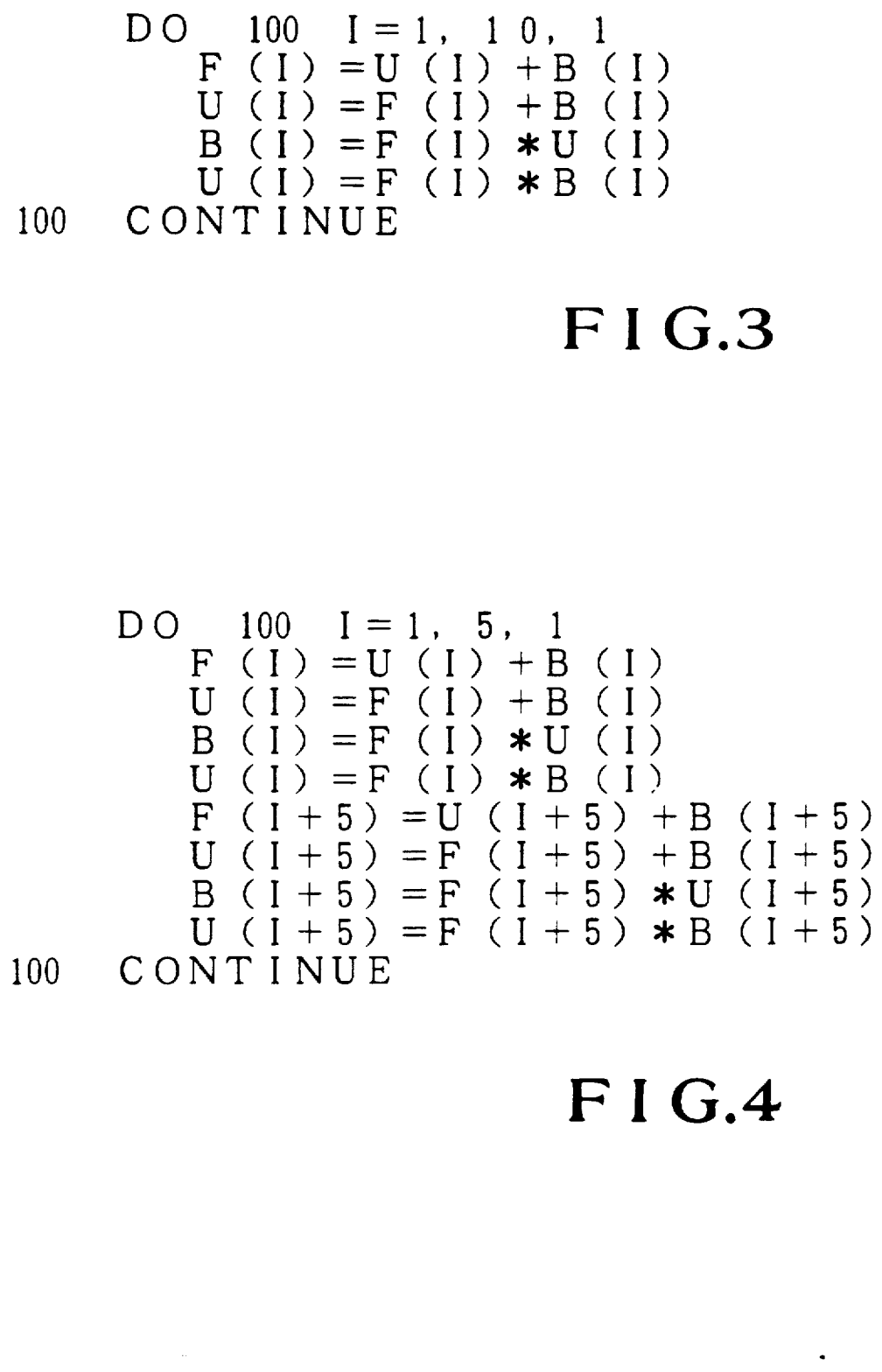

FIG. 2 is a flow chart for explaining an operation of the present invention. FIG. 3 shows an instruction string of a source program. FIG. 4 shows a new instruction string obtained by unrolling/optimizing the DO loop instruction string shown in FIG. 3. The FORTRAN compiler 3 receives, for example, the instruction string of the source program shown in FIG. 3 from the FORTRAN program file 1, and checks (step 101) whether the number of times that a DO loop in the input instruction string is repeated is an even number. If it is an even number, it is checked (step 102) whether there are a definition and a reference which span the respective repetitions of the loop. If NO in step 102, the instruction string in the DO loop is unrolled a predetermined number of times, e.g., two times (step 103). The index variable of an instruction string unrolled after the second unrolling, i.e., a newly unrolled instruction string, is updated to become an index variable obtained by predetermined arithmetic processing including a calculation based on the initial, terminal, and incrementation values of the DO loop (step 104). For example, the index value is updated to become [index variable of first unrolling + (terminal value − initial value + incrementation value)/2].

Subsequently, the terminal value of the DO loop is updated to become a value obtained by predetermined arithmetic processing including a calculation based on the above-mentioned initial, terminal, and incrementation values of the DO loop (step 105). For example, the terminal value is updated to become [(terminal value + initial value − incrementation value)/2].

As a result of the optimization described above, the instruction string shown in FIG. 4 is obtained.

Subsequently, the flow returns to step 101 to perform similar processing. Note that since the number of times that the DO loop shown in FIG. 4 is repeated is not an even number, this loop cannot be unrolled any more.

If it is determined in step 101 that the number of times of repetition is not an even number, or if it is determined in step 102 that there are a definition and a reference which span the respective repetitions of the loop, the loop is terminated without unrolling/optimizing the loop, and control is transferred to normal compile processing.

In the embodiment, FORTRAN is used as a program language. However, it is apparent that the same effect as described above can be obtained with other languages.

According to the present invention, since loop unrolling is performed upon updating of the terminal value of a loop, no contention between memory banks occurs, and the execution of a program can be optimized, i.e., the execution time can be shortened, thus providing a remarkable effect.

What is claimed is:

1. A method of unrolling/optimizing a repetitive loop, in which a program compiler in a computer system unrolls and optimizes a repetitive loop instruction, comprising the steps of:

(a) checking during compilation whether the number of times that a loop in an input source program is repeated is one of an even number or an odd number;

(b) checking whether there are a definition and a reference which span the respective repetitions of the loop, if it is determined that the number of times of repetition is an even number in step (a);

(c) unrolling an instruction string in the loop a plurality of times in response to the loop instruction, if it is determined that there are neither definition nor reference spanning repetitions of the loop in step (b);

(d) updating an index value of the newly unrolled instruction string by a first calculation based on an initial value, a terminal value, and an incrementation values of the loop;

(e) updating the terminal value of the loop by a second calculation based on the initial, terminal, and incrementation values of the loop; and (f) repeating steps (a)-(e) until the number of times that the loop is repeated is an odd number in step (a).

2. A method according to claim 1, wherein in response to the loop instruction in which neither definition nor reference are present, the instruction string in the loop is unrolled two times.

3. A method according to claim 1, wherein the index variable of the newly unrolled instruction string is updated according to the first calculation to become (the index variable + (the terminal value − the initial value + - the incrementation value)/2).

4. A method according to claim 1, wherein the terminal value of the loop is updated according to the second calculation to become ((the terminal value + the initial value − the incrementation value)/2).

5. A method according to claim 1, wherein if it is determined that the number of times of repetition is not an even number, and if it is determined that there are definition and reference which span the respective repetitions of the loop, unrolling/optimizing of the loop is terminated, and control is transferred to normal compile processing.

6. A method according to claim 1, further comprising the steps of:

receiving a source program from a source program file into the program compiler and checking whether the program satisfies predetermined conditions using a loop unrolling permission determining section;

performing an unrolling operation of a loop which satisfies the predetermined conditions for optimization in a loop unrolling section; and outputting a resultant program as a target program to a target program file.

* * * * *